May 5, 1953  P. R. VAN SITTERT  2,637,426
IMPACT TYPE CLUTCH

Filed Feb. 4, 1948  2 SHEETS—SHEET 1

INVENTOR.
PAUL R. VAN SITTERT
BY

May 5, 1953  P. R. VAN SITTERT  2,637,426
IMPACT TYPE CLUTCH

Filed Feb. 4, 1948  2 SHEETS—SHEET 2

INVENTOR.
PAUL R. VAN SITTERT
BY
Attorneys

Patented May 5, 1953

2,637,426

UNITED STATES PATENT OFFICE 2,637,426

IMPACT TYPE CLUTCH

Paul R. Van Sittert, Shaker Heights, Ohio, assignor to The Rotor Tool Company, a corporation of Ohio Application February 4, 1948, Serial No. 6,322

5 Claims. (Cl. 192—30.5)

This invention relates to clutches in general, and relates more particularly to impact devices having clutching parts automatically separable under a predetermined torque load.

Prior to this invention impact clutches have been provided with separable clutch parts biased by springs to determine the load under which the clutching parts would separate, and to re-engage the clutching parts.

More recently a clutch was developed in which a spring and a mass are provided in a tuned system, whereby the spring prevails in determining the torque at slow speeds and the inertia of the mass prevails at high speeds.

An object of this invention is to positively re-engage the clutch parts after they have separated.

More specifically, the object of this invention is to provide positive acting mechanical means to force the movable member of such a clutch into position to assure complete re-engagement of the clutch impacting surfaces after each disengagement thereof.

A still further object of this invention is to provide mechanical positive re-engagement means acting between internal correlated parts of the clutch in order to neutralize end thrusts and prevent such thrusts from being transmitted to the operator.

Other objects and a fuller understanding of the invention may be had by referring to the following description and claims, taken in conjunction with the accompanying drawings, in which:

Figure 1:
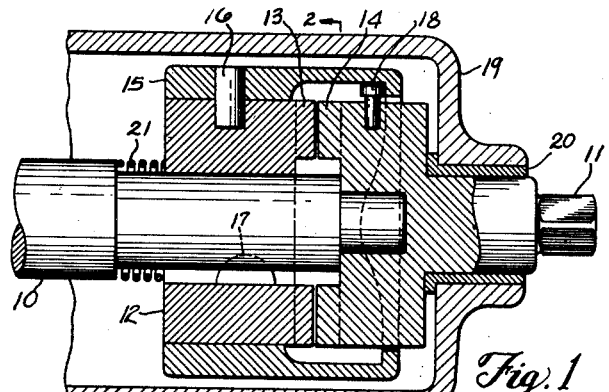
Figure 1 is a sectional view of an impact clutch embodying the principles of this invention, the clutch being illustrated disengaged as it would appear just after release.
Figure 2:
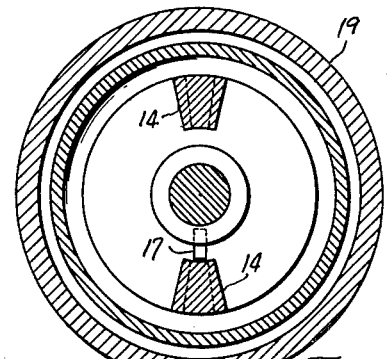
Figure 2 is a view along the line 2—2 of Figure 1.

The clutch illustrated in Figure 1 embodies a clutching action which may employ the principles of this invention. Basically, the clutch of Figure 1 comprises a driving member 10 and a driven member 11. The driving member 10 may be driven from any suitable power source, such for example as an air motor or an electric motor. The method of driving is unimportant to the principles involved in this invention, and therefore, are eliminated for clearness. The driven member 11 is illustrated with a square shank and is normally used to receive a socket for tightening nuts. However any application may be used for the driven member 11 wherein this type of clutch action is desirable.

An axially movable member 12 is mounted on the driving member 10 and is keyed thereto by a key 17. The key 17 holds the member 12 non-rotative with respect to the driving member 10, but permits longitudinal reciprocation of the member 12 on the driving member 10. The driving member 10 is bearinged in the driven member 11, as illustrated, to assure proper axial alignment of the axially movable member 12 and the driven member 11. A convenient housing 19 is provided to enclose the entire clutch assembly and the driven member 11 is bearinged in the end of the housing 19 by a suitable bearing 20.

Figure 6:
Figure 6 is an exploded perspective view of the clutch embodying the principles of this invention, the housing being removed for clearness.
Figure 7:
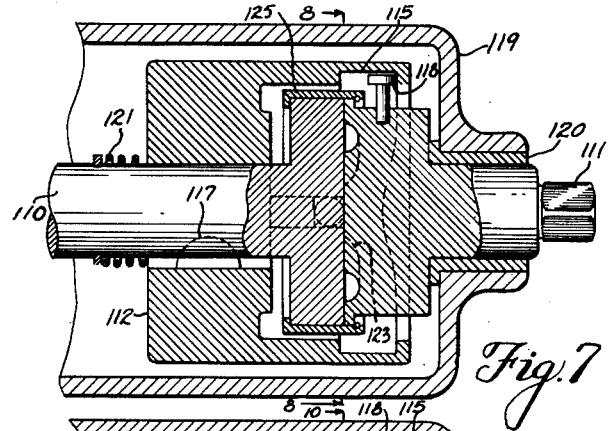
Figure 7 is a cross-sectional view of another clutch form embodying the principles of this invention, the clutch parts being illustrated just after release.
Figure 8:
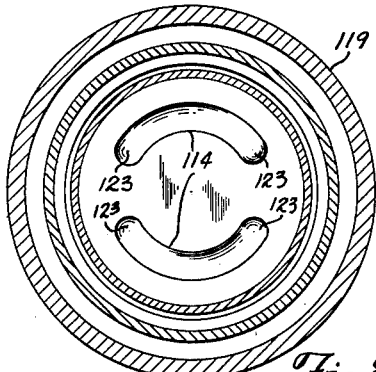
Figure 8 is a view along the line 8—8 of Figure 7.
Figure 9:
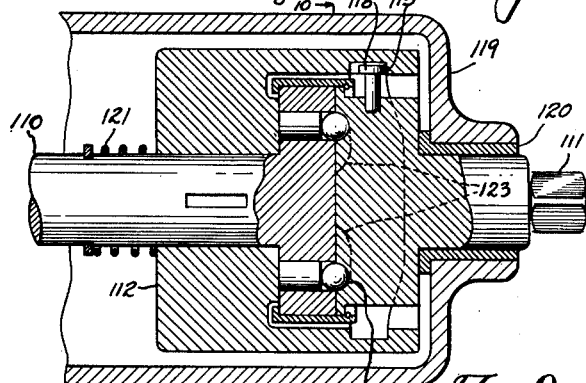
Figure 9 is a sectional view of the clutch illustrated in Figure 7 with the clutch parts rotated 90° with respect to one another as compared with their position in Figure 7.
Figure 10:
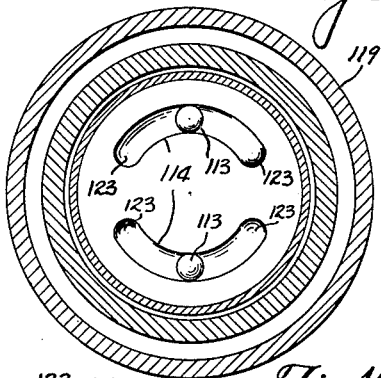
Figure 10 is a view along the line 10—10 of Figure 9.

As best illustrated in the Figure 6, the axially movable member 12 and the driven member 11 are provided with similar projecting teeth 13 and 14. In the particular type of clutch illustrated, each member is provided with two such teeth. These teeth are positioned an equal distance from the center of rotation. A spring 21 is provided on the driving member 10 and is adapted to urge the axially movable member 12 toward the driven member 11. Therefore, upon rotation of the driving member 10 the teeth 13 will be pressed forward and rotate in a circular path against the face of the driven member 11. Thus, the teeth 13 will contact the teeth 14 and tend to drive the driven member 11 therealong.

Figure 3:
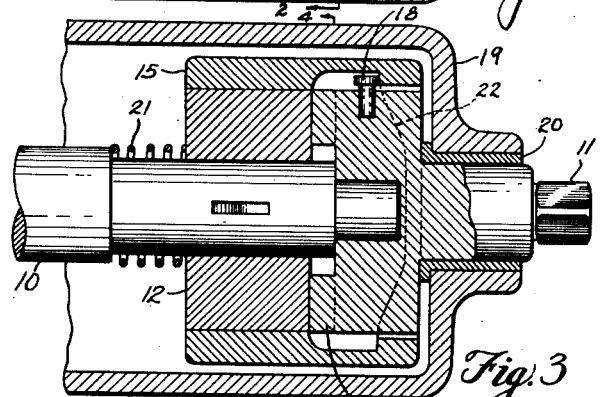
Figure 3 is a sectional view of the clutch illustrated in Figure 1 showing the driving and driven members 90° out of phase as they would appear one quarter of a revolution with respect to their relative position illustrated in Figure 1.
Figure 4:
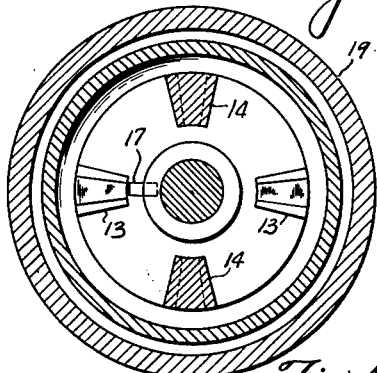
Figure 4 is a view along the line 4—4 of Figure 3.

In this type of clutch the sides of the teeth 13 and 14 are tapered at about a 20° angle and, therefore, each tooth serves as a cam and a cam follower with respect to the tooth against which it abuts, and tends to cam the teeth apart. Accordingly, if resistance to rotation of the driven member 11 is relatively light, the spring 21 will hold the axially movable member 12 in position to drive the driven member 11. However, as previously explained, the sides of the teeth 13 and 14 tend to cam the teeth apart, and therefore, tend to move the axially movable member 12 in a longitudinal direction opposed to the spring 21. Therefore, a resistance to rotation of the driven member 11 which is of sufficient magnitude to create an end thrust by cam action between the teeth 13 and 14 greater than the urge of the spring 21, will move the axially movable member 12 against the action of the spring 21 and allow the teeth 13 and 14 to separate. The teeth may then pass one another and the driving member 10 will gain momentum once it is freed of its driving load. However, after the teeth 13 have passed by the teeth 14, the spring 21 again urges the member 12 longitudinally toward the driven member 11 and the teeth 13 and 14 tend to return to the relative position illustrated in Figures 3 and 4. Thereafter, the teeth 13 will rotate until the sides thereof again contact the sides of the teeth 14 and impart an impact force to the teeth 14 and drive the driven member 11. The impact between the teeth 13 and 14 produces an endwise thrust by cam action, of course, and the member 12 is again urged to disengage the teeth.

Generally, the type of clutch illustrated is employed in portable hand tools and must, therefore, be relatively light in weight. A light weight motor will be sufficient to cause quite high impact torque on the member 11 if the teeth 13 and 14 can be kept in contact long enough to take advantage of momentum built up in the axially movable member 12. Some prior clutch devices employ a relatively large spring 21 and others employ a relatively large mass in the axially movable member 12. In any event, the driving member 10 will be rotated at relatively high speed in order to develop sufficient impact torque. At high speed it has been found that the member in the prior art devices corresponding to member 12 will remain in the disengaged position for sufficient length of time to permit the teeth to go more than one half a revolution before they are again urged into impact position. Whenever the clutch skips several revolutions before again impacting, the efficiency of the clutch is materially reduced and the length of time required for tightening is materially increased.

Figure 5:
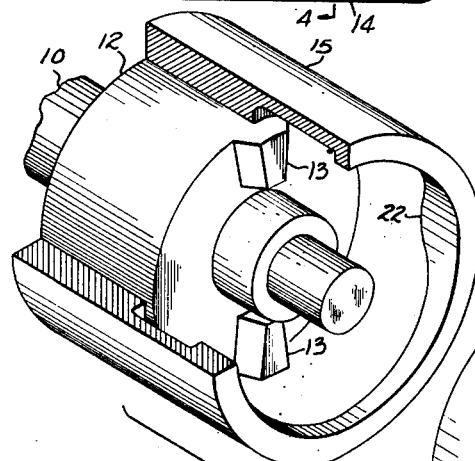
Figure 5 is a fragmentary view of the positive re-engaging cam and follower in their relative position just prior to re-engagement of the clutch parts.

This invention provides positive re-engagement of the teeth 13 and 14 upon each 180° revolution of the driving member 10. In the embodiment illustrated in the Figure 1, a cam track member 15 is secured to the axially movable member 12 by means of a pin 16. A cam follower 18 is carried by the driven member 11, as illustrated in the drawings. The cam track member 15 provides camming surfaces 22 positioned substantially 90° out of phase relative to the teeth 13 and 14. The cam follower 18 is attached to the driven member 11 at a suitable annular position to contact the camming surfaces 22 and force the cam track member 15 and the axially movable member 12 to move longitudinally toward the driven member 11 within 180° of revolution. Therefore, after the teeth 13 and 14 have separated and passed by one another substantially as illustrated in the Figure 1, the cam surfaces 22 and the cam follower 18 engage and force the member 12 longitudinally toward the driven member 11 until the teeth 13 are drawn up toward the driven member 11 far enough to place the teeth 13 into position to assure complete re-engagement of the teeth 13 and 14 upon impact. As illustrated in the Figures 3 and 4, the member 12 is under positive mechanical compulsion to stay in that position, because the camming surfaces 22 and the cam follower are in contact and will prevent longitudinal movement of the axially movable member 12. It is necessary, of course, to release the axially movable member 12 for unrestricted axial movement prior to contact between the teeth 13 and 14. The camming surface is so formed that further revolution of the cam track member 15 will separate the camming surface 22 from the cam follower 18 substantially as illustrated in Figure 5. Therefore, at the relative position where impact results between teeth 13 and 14, the cam follower 18 and the camming surface 22 will be out of contact and axially movable member 12 will be free to move longitudinally away from the driven member 11 and permit the teeth 13 to pass the teeth 14.

The camming surface 22 is illustrated as a gently flowing surface as its perferred form. However, a cam lug could be placed at the position illustrated by the reference character 22 in Figure 6 to accomplish the camming action. Such a lug, however, would place an undue strain upon all members because of the sudden camming action provided.

Although other types of mechanical camming from the housing 19 or elsewhere may be included within the scope of this invention, nevertheless, the embodiment illustrated wherein both the impact thrust and positive returning thrust are confined to the axially movable member 12 and driven member 11 is preferred because this method neutralizes and minimizes thrust forces which might otherwise be transmitted to the operator of the device.

With the positive mechanical re-engagement provided by this invention, the spring 21 is not essential to successful operation of the clutch, but is desirable to aid at starting, and is a particular aid when the tool is used in an upward direction in which the axially movable member will tend to move into a release position by gravity.

In the Figures 7 through 12 another type of clutch is illustrated in which the principles of this invention have been incorporated. In the Figure 7 the driving member is illustrated by the reference character 110 and the driven member by the reference character 111. The axially movable member 112 includes the cam track member as an integral portion 115. The axially movable member 112 is keyed to the shaft 110 by a key 117 which permits longitudinal movement, but holds the member 112 for rotation with the shaft 110. A cam follower 118 is carried by the driven member 111 substantially as set forth in the Figure 1, and the housing 119 and the bearing 120 are in all respects similar to that illustrated in Figure 1. A spring 121 is provided around the shaft 110 to urge the axially movable member 112 toward the driven member 111.

In this clutch, the driving member 110 and the driven member 111 are held face to face by a retaining ring 125. Two arcuate ball tracks 114 are provided in the face of the driven member 111 and two longitudinal bores 126 are provided through the face of the driving member 110 substantially as illustrated in the Figure 12. Force transmitting pins 116 extend through the bores 126 and are adapted to transmit force from the axially movable member 112 to balls 113, or under certain circumstances, resist movement of balls 113 away from the face of the driven member 111. The ball tracks 114 are tapered at the ends to provide cam surfaces 123. Therefore, it will be readily seen that the driving member 110 will rotate and carry the balls 113 in the end of the bores 126 and in the ball tracks 114 until the end of the tracks 114 are reached. Thereafter, the balls 113 will be pinched between the cam surfaces 123 and the sides of the bores 126 and will transmit driving force from the member 110 to drive the member 111. However, upon development of a predetermined torque, the cam surfaces 123 will force the balls 113 into the bores 126 against the force transmitting pins 116 and against the axially movable member 112. At slow speed the described endwise movements of the balls 113 will be resisted primarily by the spring 121, but at high speeds when the balls 113 must be quickly displaced from the ball tracks 114, the movement of the balls will be resisted by the inertia of the axially movable member 112.

Figure 11:
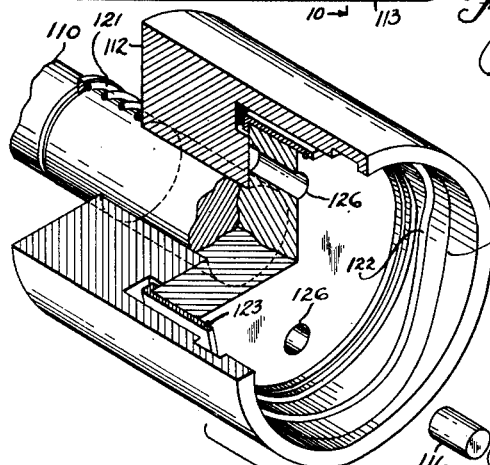
Figure 11 is a fragmentary view of the positive re-engaging cam and the cam follower in their position just prior to impact of the clutch parts.
Figure 12:
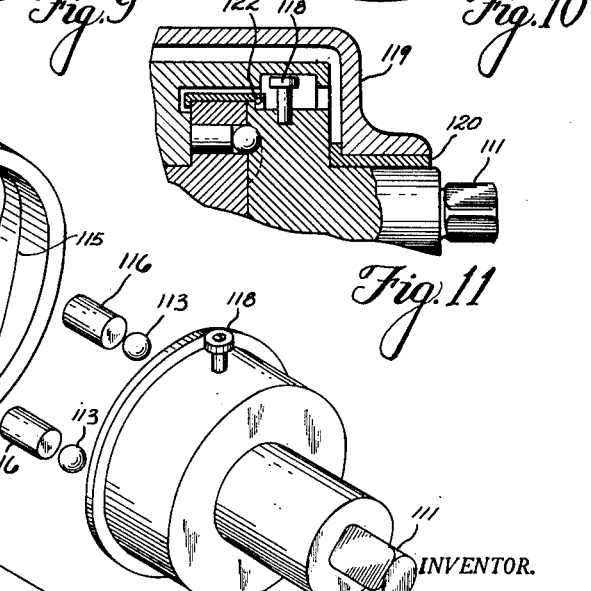
Figure 12 is an exploded perspective view of the clutch of Figure 7 embodying the principles of this invention, the housing being removed for clearness.

As explained in conjunction with the clutch illustrated in Figure 1, the spring 121 will be sufficient to press the balls 113 back into the tracks 114 at slow speed, but at high speed the driving member 110 will quite possibly rotate at least one full revolution before the spring 121 is able to move the mass of the member 112 forward to force the balls 113 into the tracks 114. Therefore, camming surfaces 122 are provided and will contact the cam follower 118 as described in conjunction with the clutch illustrated in Figure 1. Figure 11 illustrates the space between the cam track on the portion 115 and the follower 118 just prior to contact between the balls 113 and the cam surfaces 123 at the end of the ball tracks 114.

With the positive mechanical re-engagement provided by this invention, the spring 121 is not essential to successful operation of the clutch, but is desirable to aid at starting, and is a particular aid when the tool is used in an upward direction in which the axially movable member will tend to move into a release position by gravity.

In the embodiments of the clutch illustrated, the cam means for separating the clutch parts, and the cam means for positively reengaging the cam parts, are symmetrical in order that the clutch may be reversible, that is, will operate equally well in a clockwise or counter clockwise rotational direction.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a rotatable driving member, a driven member substantially coaxial therewith, clutch means including axially movable means having torque transmitting teeth thereon, said driven member having torque receiving teeth thereon, cam surfaces between said teeth for axially moving said movable means in one direction to effect disengagement of the teeth under a predetermined resistance to rotation of the driven member, and positive re-engaging means adapted to draw the movable means in the opposite direction to effect a clutching engagement between the teeth for transmitting torque to said driven member, said positive re-engaging means including a cam track and cam follower, each said cam track and cam follower being nonrotatively mounted upon one of said relatively movable driven member and movable means, said cam track and cam follower acting on the movable means and driven means at a circumferential position out of phase with said teeth to draw the movable means in said opposite direction after the said disengagement has been effected.

2. In combination, a rotatable driving member, a driven member, clutch means including axially movable means having torque transmitting surfaces thereon, said driven member having torque receiving surfaces thereon, said torque transmitting and torque receiving surfaces constituting cam means for axially moving said movable means in one direction to effect disengagement of the torque transmitting surfaces under a predetermined resistance to rotation of the driven member, and positive re-engaging means adapted to draw the movable means in the opposite direction to effect a clutching engagement between the torque transmitting and torque receiving surfaces for transmitting torque to said driven member, said positive re-engaging means including a cam track and cam follower carried respectively in nonrotative and longitudinally fixed relationship with said relatively movable driven member and movable means, said cam track and cam follower acting on the movable means and driven means at a circumferential position out of phase with said torque transmitting and torque receiving surfaces to draw the movable means in said opposite direction after the said disengagement has been effected.

3. In a power wrench having relatively rotatable clutch parts with interference surface means disposed therebetween at annularly spaced intervals to transfer driving energy from one to the other when positioned in a common rotative path, and which interference means has cam surfaces for moving the interference surface means out of said common path to separate the interference surface means and discontinuing the transfer of driving energy upon a predetermined torque transfer, the provision of additional cam surface means carried by one of the clutch parts and cam follower means carried by the other clutch part operative upon relative rotation of the clutch parts after disengagement thereof to provide a positive movement of the interference surface means into said common rotative path, but out of phase with one another, to thereby assure full engagement of the interference surface means upon each rotative sequence.

4. In a power wrench with mating rotatable drive transfer clutch parts having drive transfer and release positions with respect to one another, and with cam action drive transfer surfaces spaced at annular intervals acting therebetween to transfer driving force from one clutch part to the other until the torque transferred through the cam action drive transfer surfaces urges the clutch parts to said release position, the provision of mechanical cam means and cam follower means carried by the clutch parts positioned to force the clutch parts fully back into said operable position but annularly out of phase after each separation thereof.

5. A power wrench comprising a rotatable hammer and a rotatable anvil, means for driving said hammer, successively disengageable and re-engageable impact shoulders on said hammer and anvil respectively, angular cam surfaces on said impact shoulders automatically causing disengagement of said impact shoulders, and cam with cam follower means out of phase with said impact shoulders for automatically positioning said impact shoulders into an impact position upon subsequent further relative rotation of the hammer and anvil, said cam carried in a fixed position with respect to one of said hammer and anvil members although shiftable therewith in the event the member shifts, said cam follower carried in a fixed position with respect to the other of said hammer and anvil members although shiftable therewith in the event the member shifts.

PAUL R. VAN SITTERT.

References Cited in the file of this patent

UNITED STATES PATENTS

| Number | Name | Date |
|---|---|---|
| 1,657,274 | Niedhammer | Jan 24, 1928 |
| 2,061,843 | Nunier | Nov. 24, 1936 |
| 2,143,173 | Shaff | Jan. 10, 1939 |
| 2,339,530 | Van Sittert et al. | Jan. 18, 1944 |
| 2,339,531 | Van Sittert et al. | Jan 18, 1944 |